2,978,421

United States Patent Office
Patented Apr. 4, 1961

2,978,421

NITRILE COPOLYMERS AND METHOD OF PREPARING SAME

John A. Holloway, Cleveland, Ohio, assignor to The B. F. Goodrich Company, New York, N.Y., a corporation of New York No Drawing. Filed June 9, 1958, Ser. No. 740,566

9 Claims. (Cl. 260—17.4)

This invention relates to cross-linked alpha-beta olefinically unsaturated nitrile polymers and more particularly pertains to copolymers of alpha-beta olefinically unsaturated nitriles and polyalkenyl polyethers of polyhydric alcohols and methods for their preparation.

An object of this invention is the provision of insoluble, cross-linked polynitriles which are capable of thickening certain non-aqueous polar solvents. Another object is the provision of methods for preparing these novel cross-linked polynitriles. These and other objects of this invention will become more apparent in the folowing description and examples.

Copolymers of acrylonitrile and divinyl benzene have been discussed in the chemical literature (Faserfarsch. U. Textiltech. 4, 454 (1953). In general the acrylonitrile-divinyl benzene copolymers heretofore known are markedly inferior in thickening power in non-aqueous polar solvents when compared with the polymers of this invention.

We have discovered that copolymers of an alpha-beta olefinically unsaturated nitrile such as acrylonitrile or methacrylonitrile and certain polyalkenyl polyethers of polyhydric alcohols when copolymerized in the ratio of 99.95 to 95 parts of unsaturated nitrile and from about 0.05 to about 5 parts of said polyalkenyl ether have unexpected thickening power in certain non-aqueous polar solvents such as dimethyl formamide, dimethyl acetamide, dimethyl sulfoxide, N-methyl pyrrolidone, gamma butyrolactone, tetrahydrofuran and the like and others.

As used herein the term "alpha-beta olefinically unsaturated nitrile" is defined to mean an alpha-beta olefinically unsaturated mononitrile having from 3 to 4 carbon atoms and having a terminal $CH_2=C<$ group.

The polyalkenyl polyethers useful in the production of the polymers of this invention contain more than one alkenyl ether per molecule and those most useful possess alkenyl groups in which an olefinic double bond is present attached to a terminal methylene group thusly $CH_2=C<$. They are made by the etherification of a polyhydric alcohol containing at least 4 carbon atoms and at least 3 hydroxyl groups. Compounds of this class are readily produced, for example, by a Williamson-type synthesis, in which an alkenyl halide, or a mixture of such halides, such as allyl chloride, allyl bromide, methallyl chloride, methallyl bromide and others, is reacted with a strongly alkaline aqueous solution of one or more of the polyhydric alcohols. The product of such a synthesis usually is a complex mixture of polyethers containing varying numbers of ether groups on each molecule. Analysis of such materials, therefore, reveals only the average number of ether groupings on each molecule. These mixtures, however, if they analyze as containing an average number of ether groups per molecule greater than one, are capable of producing the insoluble nitrile polymers of this invention. Since the efficiency of the polyether cross-linking agent increases with the number of potentially polymerizable groups on the molecule, it is much preferred to utilize polyethers containing an average of two or more alkenyl ether groupings per molecule. The polyvinyl polyethers of the polyhydric alcohols within the above broad class are produced by reacting acetylene with the polyhydric alcohol (or an alcoholate thereof) in a Reppe-type vinylation synthesis. The polycrotyl ethers of the polyhydric alcohols are also useful although they do not contain a terminal $CH_2=C<$ group.

Illustrative polyhydric alcohols of the above-described class that may be utilized in the preparation of the polyalkenyl polyether cross-linking agent include the butane triols such as 1,2,3-butane triol, 2,3,4-trihydroxy butyric acid, the aldotetroses such as erythrose and threose, ketotetroses such as erythrulose; the aldopentoses such as arabinose, xylose, lyxose, and ribose; ketopentoses such as araboketose, and xyloketose; aldohexoses such as glucose, galactose, mannose, gulose, idose, talose, allose and the like; ketohexoses such as fructose or levulose, sorbose and the like; other sugars including the mono-, di-, tri- and polysaccarides such as sucrose, maltose, lactose and raffinose; reduced forms of the above and other sugars and polysaccharides such as the so-called "sugar alcohols" erythritol, xylitol, mono-, di- and tripentaerythritol, arabitol, mannitol, iditol, tolitol, sorbitol, inositol, dulcitol and others; the oxidized derivatives of the sugars in which the oxidation has not been carried to the point where the monosaccharide carbon chain unit is broken such as the mono- and dicarboxylic "sugar acids" including gluconic acid, glucuronic acid, galactonic acid, galacturonic acids, saccharic acid, mucic and pectic acids and other polyhydric alcohols of the class described.

A preferred class of polyhydric alcohols for use in the production of the polyalkenyl polyether monomer are known as the monosaccharides and oligosaccharides, the latter are defined as containing from two to four monosaccharide units. In addition to the oligosaccharides themselves, their reduction products such as the alcohols, keto-alcohols and aldo-alcohols and their oxidation products which retain the original saccharide chain such as the sugar acids, the keto-acids, the aldo-acids and the like can be used. Illustrative saccharides of this class are the monosaccharides, such as glucose, galactose, fructose, sorbose, rhamnose, and the like; disaccharides such as sucrose, arabinose, maltose, lactose, and the like; trisaccharides such as raffinose and others. Of these the disaccharide, sucrose, is much preferred because of its ready availability and its ability to produce polyethers of great reactivity with nitrile monomers.

The polymers of this invention can be made in water emulsion or suspension systems, in bulk or in solvent systems with free radical initiators. The most preferred method for preparing the polymers embodied in this invention is the aqueous emulsion system because of the high solids obtainable and the relative safety and cheapness of this type of system. The product can be isolated as a granular powder by coagulation, freeze-drying, drum drying or spray drying techniques.

Polymerization in an organic liquid which is a solvent for the monomers but a non-solvent for the polymer, or in a mixture of such solvents, in the presence of a solvent-soluble catalyst can also be employed. The polymers resulting from this polymerization technique are usually obtained as very fine, friable and often fluffy precipitates, which after solvent removal, seldom require grinding or any other further treatment before use. Suitable solvents for the latter method include benzene, xylene, tetralin, hexane, heptane, carbon tetrachloride, methyl chloride, ethyl chloride, bromotrichloromethane, and others, and mixtures of these and other solvents.

Polymerization may be carried out in the presence of a free radical catalyst in a closed vessel in an inert atmosphere and under autogenous pressure or artificially induced pressure or in an open vessel under reflux at atmospheric pressure. The temperature of the polymerization may be varied from 0° C. or lower to 100° C. or higher, more preferably from 20 to 90° C., depending to a large degree on the molecular weight desired in the polymer. Polymerization under reflux at 50 to 100° C. under atmospheric pressure using a free radical catalyst is generally effective in bringing a polymer yield of 75 to 100% in less than 10 hours, usually in less than 5 hours. Suitable free radical catalysts include peroxygen compounds such as sodium, potassium and ammonium persulfates, caprylyl peroxide, benzoyl peroxide, hydrogen peroxide, pel-argonyl peroxide, cumene hydroperoxides, tertiary butyl diperphthalate, tertiary butyl perbenzoate, sodium peracetate, sodium percarbonate, and the like as well as azo-bis-diisobutyronitrile and the so-called "redox" type of catalyst, such as a mixture of potassium persulfate and sodium bisulfite.

The polymers of this invention are useful thickeners for polar non-aqueous solvents. The thickened compositions thus formed are excellent gels which are useful in removing paint from wood, metal, ceramic and glass surfaces and they are particularly useful for removing paint from vertical and overhead surfaces because of their viscous and adhesive nature.

In the following examples which serve to illustrate the products and processes of this invention the amounts of ingredients are given in parts by weight unless otherwise indicated and viscosities are Brookfield viscosities expressed in centipoises.

Example I

The emulsion recipe employed in the preparation of the polymers used in this and in the succeeding examples is as follows:

| | |
|---|---|
| Demineralized water _____ grams__ | 392 |
| Acrylonitrile _____ do____ | 40 |
| Polyalkenyl polyether _____ | Variable |
| 5% potassium persulfate solution _____ cc__ | 8 |
| 10% sodium bisulfite solution _____ cc__ | 1.5 |

A series of acrylonitrile-allyl pentaerythritol (containing about 2.78 allyl groups per molecule) copolymers were prepared along with an uncross-linked polyacrylonitrile which is used as a control. Mucilages of all of these polymers were prepared in dimethyl formamide and the viscosities were determined at various polymer concentrations.

| Percent Allyl Pentaerythritol in Polymer | Viscosity in Dimethyl Formamide | |
|---|---|---|
| | 3% Polymer Conc. | 5% Polymer Conc. |
| 0.1 | 20,800 | 72,000 |
| 0.3 | 28,800 | 66,000 |
| 0.6 | 34,200 | 64,000 |
| 1.2 | 15,000 | 71,600 |
| 2.4 | 11,000 | 48,000 |
| 0 (control) | 168 | 1,072 |

A small portion of the 3% dimethyl formamide gel which was made from the acrylonitrile-0.1% allyl pentaerythritol copolymer was spread on a vertical painted wood surface and was allowed to stand for a few minutes. Subsequent water flushing of the surface removed the gel and paint mixture nicely leaving the clean wood surface exposed. This same procedure was used successfully on painted metal and glass surfaces. The polymers of this example were all excellent thickeners for other non-aqueous polar solvents such as gamma-butyrolactone, N-methyl pyrollidone, N,N-dimethyl acetamide and dimethyl sulfoxide.

Example II

The general procedure described in Example I was used to prepare a series of acrylonitrile-hexaallyl sucrose (containing an average of about 5.8 allyl groups per sucrose molecule) copolymers. Mucilages of all of these polymers were prepared in dimethylformamide and the viscosities were determined at the various cross-linking levels.

| Percent Allyl Sucrose in Polymer | Viscosity in Dimethyl Formamide 3% Polymer Conc. |
|---|---|
| 0.1 | 2,700 |
| 0.3 | 4,140 |
| 0.6 | 8,600 |
| 1.2 | 6,720 |

The polymers of this example made excellent paint removers when added to dimethyl formamide, gamma-butyrolactone, N-methyl pyrrolidone, N,N-dimethyl acetamide and dimethyl sulfoxide. Methacrylonitrile-allyl sucrose copolymers having the above-mentioned cross-linking levels were comparable with the acrylonitrile-allyl sucrose copolymers in their viscosity behavior in dimethyl formamide.

It is obvious that many changes and modifications can be made in the above-described details without departing from the nature and spirit of this invention, therefore it is to be understood that the invention is not limited to said details except as set forth in the appended claims.

I claim:

1. The copolymer of a mixture of monomers consisting of (1) from 99.95 to 95 parts by weight of a member selected from the group consisting of acrylonitrile and methacrylonitrile and (2) from about 0.05 to about 5 parts by weight of a polyether of a polyhydric alcohol selected from the class consisting of monosaccharides, oligosaccharides, sugar alcohols and pentaerythritol, the hydroxyl groups of said polyhydric alcohol which are modified being etherified with allyl groups, said polyhydric alcohol having at least 2 allyl groups per alcohol molecule.

2. The composition of claim 1 wherein the polyhydric alcohol is an oligosaccharide.

3. The composition of claim 1 wherein the polyhydric alcohol is a sugar alcohol.

4. The composition of claim 1 wherein the polyhydric alcohol is pentaerythritol.

5. The copolymer of from 99.95 to 95 parts by weight of acrylonitrile and from about 0.05 to about 5 parts by weight of polyallyl sucrose.

6. The copolymer of from 99.95 to 95 parts by weight of acrylonitrile and from about 0.05 to about 5 parts by weight of polyallyl pentaerythritol.

7. The method for preparing an interpolymer of (1) from 99.95 to 95 parts by weight of a member selected from the group consisting of acrylonitrile and methacrylonitrile and (2) from about 0.5 to about 5 parts by weight of a polyether of a polyhydric alcohol selected from the class consisting of monosaccharides, oligosaccharides, sugar alcohols and pentaerythritol, the hydroxyl groups of said alcohol which are modified being etherified with allyl groups, said alcohol having at least two allyl groups per alcohol molecule, said method comprising conducting the polymerization in an aqueous medium at a temperature of from 20° C. to 100° C. in the presence of a free radical catalyst.

8. The method of claim 7 wherein the free radical catalyst is water soluble.

9. The method of claim 8 wherein the free radical catalyst is a mixture of potassium persulfate and sodium bisulfite.

References Cited in the file of this patent

UNITED STATES PATENTS

| | | |
|---|---|---|
| 2,332,895 | D'Alelio | Oct. 26, 1943 |
| 2,336,985 | Freund | Dec. 14, 1943 |
| 2,462,817 | Smith | Feb. 22, 1949 |
| 2,798,053 | Brown | July 2, 1957 |

OTHER REFERENCES

Noller: "Chemistry of Organic Compounds," published by Saunders Co., Philadelphia, 1951, page 345.